(12) United States Patent
Gruttadauria et al.

(10) Patent No.: US 7,263,696 B1
(45) Date of Patent: Aug. 28, 2007

(54) DYNAMIC WEB BASED JAR FILE FINDER

(75) Inventors: Brian R. Gruttadauria, Sutton, MA (US); Nancy J. Welch, Charlton, MA (US)

(73) Assignee: EMC Corporation, Hopkinton, MA (US)

( * ) Notice: Subject to any disclaimer, the term of this patent is extended or adjusted under 35 U.S.C. 154(b) by 1018 days.

(21) Appl. No.: 10/315,412

(22) Filed: Dec. 10, 2002

(51) Int. Cl.
G06F 9/45 (2006.01)
(52) U.S. Cl. .................................. 717/166
(58) Field of Classification Search ............... 717/169, 717/166
See application file for complete search history.

(56) References Cited

U.S. PATENT DOCUMENTS

| | | | |
|---|---|---|---|
| 5,828,887 A * | 10/1998 | Yeager et al. | 717/167 |
| 5,966,702 A * | 10/1999 | Fresko et al. | 707/1 |
| 6,052,732 A * | 4/2000 | Gosling | 709/229 |
| 6,279,030 B1 * | 8/2001 | Britton et al. | 709/203 |
| 6,339,841 B1 * | 1/2002 | Merrick et al. | 717/166 |
| 6,754,696 B1 * | 6/2004 | Kamath et al. | 709/213 |
| 6,999,976 B2 * | 2/2006 | Abdallah et al. | 707/200 |
| 2004/0019887 A1 * | 1/2004 | Taylor et al. | 717/166 |

OTHER PUBLICATIONS

"Do I Have to Use Liveconnect to Run a Javascript Function From Java"; Patrick Roemer; Aug. 17, 1999; Two Pages; HTTP://GROUPS.GOOGLE.COM/GROUPS?Q=APPLETCONTEXT+SHOWDOCUMENT+JAVASCRIPT+HL=EN+LR=+IE= UTF-8+SELM=37B9D23F.8F97C79% 40CS.UNI-BONN.DE+RNUM=6.

"Applet Lifecycle in Netscape Communicator"; Warren Harris; 1999; Four Pages; HTTP://DEVELOPER.NETSCAPE.COM/DOCS/TECHNOTE/JAVA/APPLETLIFE.HTML Printdate Oct. 18, 2002.

"Displaying HTML From an Applet"; Ronald Tschalär; Mar. 19, 2000; Three Pages; HTTP:IIWWW.INNOVATION.CH/JAVA/HTTPCLIENT/DISP_HTML.HTML.

* cited by examiner

*Primary Examiner*—John Chavis
(74) *Attorney, Agent, or Firm*—Krishnendu Gupta; Joel Wall; Robert Kevin Perkins

(57) ABSTRACT

A technique for enhancing the startup operation of a user application within a client server network. At least the client is running software in JAVA language. Java Archive (JAR) files needed for startup are housed in the server. Rather than hard code the Jar files which makes upgrades difficult, embodiments of the present invention employ two applets operating on the same HTML page in the client. One applet, the Jar finder applet obtains all Jar files needed for startup from lists of Jar files stored in a directory which is also housed in the server. This directory is readily accessible to software developers allowing its easy modification by adding or removing Jar files or by substituting an entirely new directory. Another applet, the Jar user applet (or user application) receives the lists of Jar files from the Jar finder applet and thereafter obtains the actual Jar files from the directory in the server. After loading the Jar files, the Jar user applet launches the user application and the startup operation of the network is concluded.

22 Claims, 3 Drawing Sheets

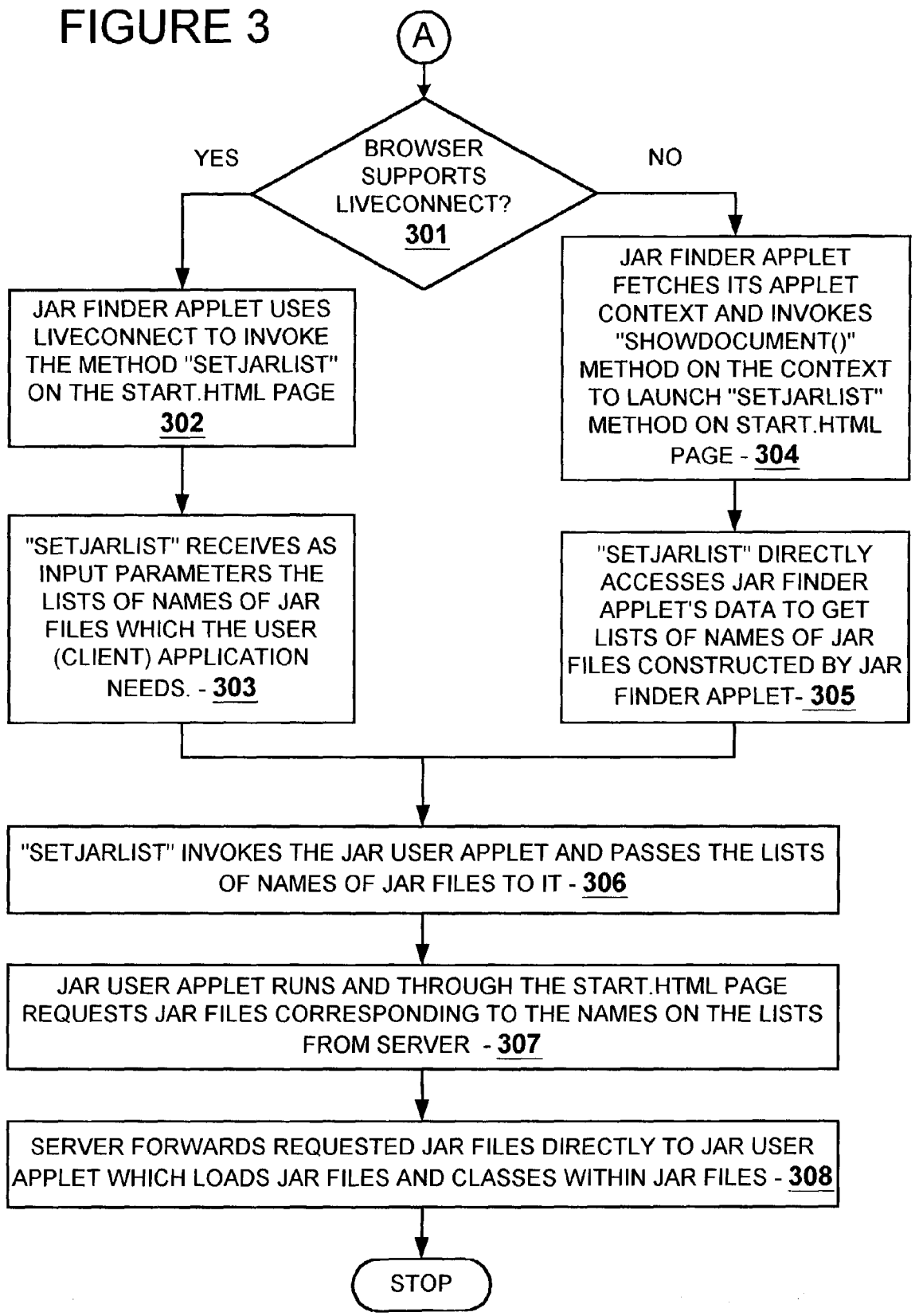

DYNAMIC WEB BASED JAR FILE FINDER

BACKGROUND OF THE INVENTION

A portion of the disclosure of this patent document may contain command formats and/or other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to apparatus, methodology, systems, and/or computer program product for facilitating startup of application software in a client server network, and, more particularly, to the loading of Java archive (Jar) files needed for startup from the server into the client for clients running user applications written in Java software.

DESCRIPTION OF PRIOR ART

Client server network configurations are used widely in the computer arts. In these networks, a client (which may comprise a workstation including terminal, keyboard, mouse, etc. along with its human operator) requests information which is provided, or served-up, by its server(s). These network configurations can be very complex, and the startup operation of application software in a client server network follows a prescribed routine which, typically, is "hard-wired" into the hardware and/or software of the network. In other words, if there are changes to be made to the startup operation, this would typically require major reworking of at least the software of the client and/or server(s) in the network.

Today, in a network where the client is running user applications written in the JAVA® language, a software developer writing client code typically hard codes the Jar files (essentially libraries or "LIBS") needed for startup of application software. These Jar files may be hard coded on a software support platform or page/file such as a hypertext markup language (HTML) page/file. This is disadvantageous because the next revision that includes a new Jar file which needs to be installed could require a manual update of this page, or even require the installation of a new page on the site where the network is physically located. These upgrade activities almost always require a substantial amount of developer time and effort even if few Jar files are used. However, many Jar files can frequently be involved.

For example, it is not uncommon for an applet (a JAVA compatible program designed to be executed from within another software application) to require many Jar files in order to load and run. One technique of specifying these Jar files is to list them in an HTML file which launches the applet. For example, in client server networks involving EMC CLARiiON® storage systems, such HTML file launches the NAVISPHERE® distributed management software applet. However, listing all of these Jar files explicitly in an HTML file can be cumbersome and error-prone, especially as more Jar files are added. Moreover, packaging of such a product becomes very complex, since customers may want to avoid purchasing irrelevant Jar files or features in certain Jar files. Customers may also wish to purchase different language versions which would typically require a different and separate set of Jar files. Since there are potentially dozens of combinations of products/languages that could be bundled onto a deliverable compact disk (CD), there is a need for a product/service by which a dynamic determination can be made of which Jar files on the CD shall be made available to a particular customer.

Computer hardware and software systems may be trending towards ever-increasing "modularization". For example, under certain conditions, a new piece of software may be modularized so that it can "plug-in" to existing software to change the overall software functionality to a result that would otherwise previously have been obtained only by a complete reworking of the existing software. In fact, the term "plug-in" may be used to define a software program that extends the capabilities of a prior program into which it "plugs". For example, with respect to browser software needed to communicate via the Internet, certain software which plugs into the browser and permits the playing of audio samples or permits the viewing of video movies within the browser are termed "plug-ins".

Accordingly, with respect to software, such as JAVA software, needed at the time of application software start-up in a client server network, there is a need for such software to be "plugable" to facilitate changes thereto without requiring arduous revisions to the main manager application or main framework software. This plugability feature for this purpose with this software has not heretofore been available, but would be a great help to software developers by saving them a substantial amount of time and effort. The present invention satisfies this need in virtually any client-server environment running JAVA language software.

SUMMARY OF THE INVENTION

Embodiments of the present invention include apparatus, methodology, systems, and/or computer program product for facilitating startup operation of a user application in a client server network in which the client is running user applications written in the JAVA language. Jar files required by the client for startup need to be loaded from the server into the client. To accomplish this, a support platform file is established in the client, the file including a list of directories containing names of the Jar files. Both a Jar finder (or Jar file finder) applet and a Jar user (or Jar file user) applet are established in the support platform file. The list of directories are read into the Jar finder applet. The Jar finder applet forwards the list of directories to the server and requests a list of names of Jar files in the directories. The server returns the list of names of Jar files to the Jar finder applet. The list of names of Jar files is passed from the Jar finder applet to the Jar user applet. The Jar user applet operating through the support platform file requests the Jar files themselves from the server. The Jar user applet then receives the Jar files directly from the server, and loads the received Jar files and classes within the Jar files.

In a further feature, the support platform file may be an HTML file or page written in JavaScript language (a scripting language developed independently of JAVA but sharing features and structures of JAVA and enabling Web authors to design interactive sites containing dynamic content). The client may include a workstation interfacing with a human operator or user pointing an Internet web browser at the server (entering the IP address of the server into the Uniform Resource Locator or URL slot in the browser's dialogue on the terminal screen). The web browser could be either Microsoft Corporation's Internet Explorer® browser or AOL Corporation's Netscape Navigator® browser or other browser. The Jar files can be readily modified by the software developer's adding to or deleting from the total of Jar files, by changing the list of directories, or by exchanging the list of directories with a different list of directories.

It is thus advantageous to employ the present invention in client server networks running software in JAVA language on the client because the present invention provides "plugability" in the WEB sense between client and server at start up time and thereby permits easier modification of software needed at application software startup time as compared with prior modification techniques. The present invention permits greater flexibility for developers of web applications. Developers can now divide their applications into as many Jar files as may be appropriate, without having to manually list these Jar files in the HTML file that launches their applets. This provides less error-prone development, greater flexibility in packaging the web application, and faster download times when the application is run because unnecessary Jar files are eliminated from the purchased package. Other features and advantages will be understood after referring to the detailed description of the preferred embodiments and to the appended drawings wherein:

DESCRIPTION OF THE PREFERRED EMBODIMENTS

Overview

The present invention comprises at least: (i) an HTML file containing JavaScript code, and (ii) an applet launched from the JavaScript code which scans directories for jar files. A developer supplies the list of directories to scan by setting a string variable in the JavaScript code. When a client points its browser to a server and requests its HTML file, the file launches its directory-scanning applet (Jar finder applet) and discovers all Jar files in those directories. The resulting list of Jar files will then be forwarded to the application (Jar user applet) which the client actually wants to run to accomplish the task of interest. In the case of an EMC CLARiiON® storage network, the Jar user applet is NAVISPHERE® 6X distributed management software running within a selected browser. The JavaScript HTML file contains separate code paths for Netscape Navigator versus Internet Explorer browsers, and separate code paths for Windows versus non-Windows operating systems. Accordingly, the JavaScript code of the present invention can be used with either Netscape Navigator or Internet Explorer browsers on either Windows, Sun Solaris, or Linux platforms, and should be able to be used with other browsers that may yet be developed and which shall operate on these platforms.

The Jar files contain all the Java classes needed to run the user application software (or applet). Essentially, the contents of the Jar files are a JAVA applet (the Jar user applet) which implements the user application software. The user applet is launched with a "document.writeln" method to be discussed below. The string which is passed to this method contains the names of the Jar files which the Jar finder applet has obtained including the name of the Java class which must be invoked "first" to get the applet to run. This class is the applet's entry point.

Figure 1:
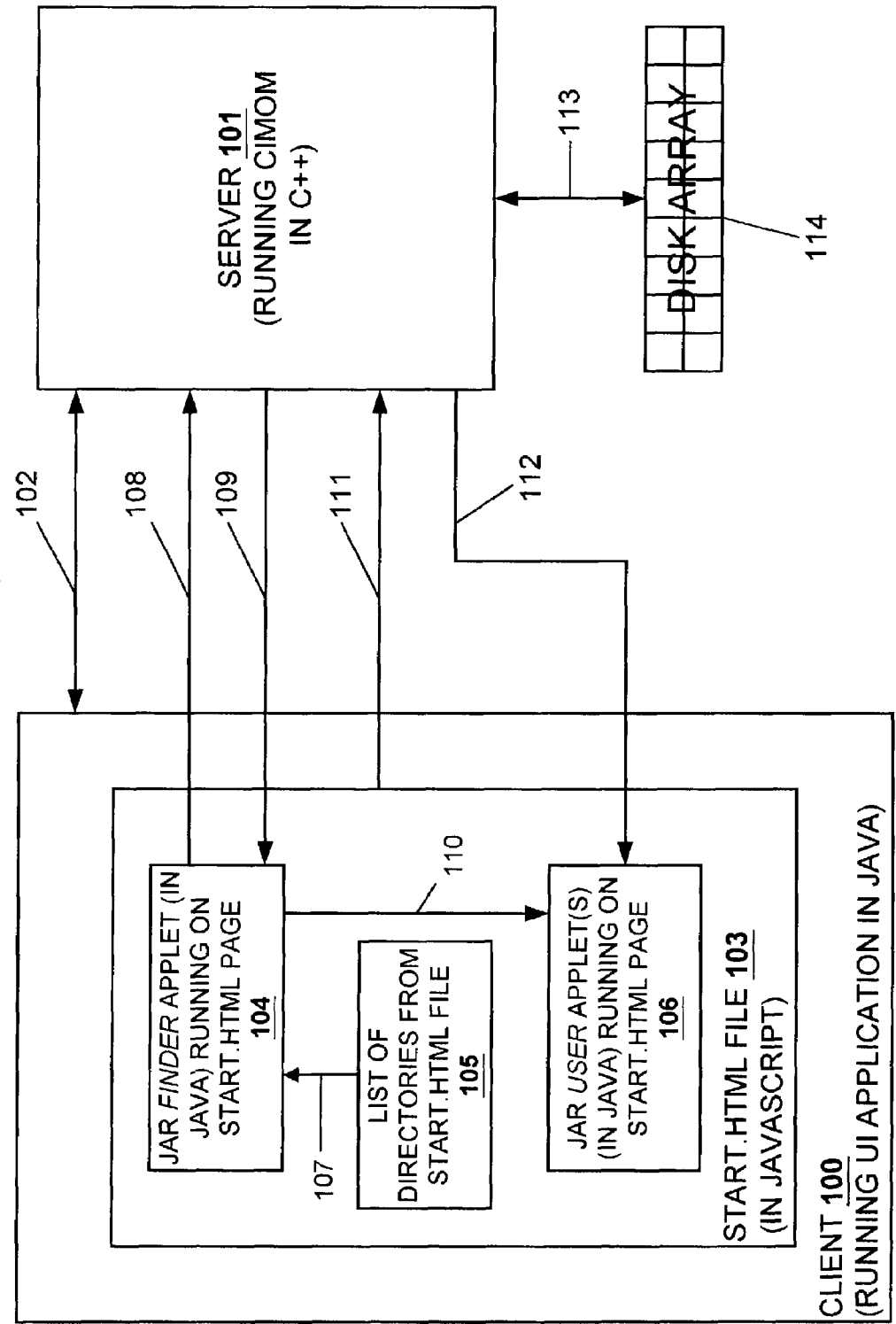
FIG. 1 is an exemplary block diagram of a client server network in which embodiments of the present invention may be employed.

FIG. 1—Client Server Network

FIG. 1 is an exemplary block diagram of a client server network in which embodiments of the present invention may be employed. Clients and servers may typically be computers which are configured to run, or capable of running, computer program product or software including a computer-usable medium having computer readable program code thereon. Client 100 at the left of the diagram may comprise at least a workstation including terminal, processor, keyboard, mouse, etc. along with its human operator or user. Client 100 is depicted as running User Interface (UI) application software which may be written in JAVA language, and which was started-up through operation of the present invention. Server 101 at the right of the diagram may be running common information model object manager (CIMOM) software which may be written in C++ language. Disk array(s) 114 is shown operatively coupled to server 101 via bidirectional link 113 whereby the client server network in this example is being used for at least data storage purposes. However the present invention is not limited to storage networks and may be implemented in any client server network running appropriate software.

Start.HTML file or page 103 (a software construct) is depicted as operating within client 100. Three software constructs are depicted as running on start.HTML page 103, namely: Jar finder applet 104, Jar user applet 106, and List of Directories (or Directory List) 105. These three components are operatively interrelated. Directory list 105 is operatively coupled to Jar finder applet 104 via method call 107. Jar finder applet is operatively coupled to Jar user applet via method call 110.

Additionally, client 100 and its components and server 101 are communicatively coupled. Client 100 and server 101 are directly operatively coupled through network connection 102. Jar finder applet 104 and server 101 are operatively coupled through network connections 108 and 109. Start.HTML file/page 103 is operatively coupled to server 101 over network link 111. And, server 101 is operatively coupled to Jar user applet 106 via network link 112. Network links/connections 102, 108, 109, 111, 112, and 113 may all be Hyper Text Transfer Protocol (HTTP) links/connections or the equivalent. (HTTP is the underlying protocol used by the World Wide Web and defines how messages are formatted and transmitted and what actions Web servers such as server 101 and browsers such as Netscape Navigator or Internet Explorer should take in response to various commands.) Operation of the present invention illustrated in block diagram form in FIG. 1 may best be presented in connection with the flowcharts of FIGS. 2 and 3 hereinbelow.

Figure 2:
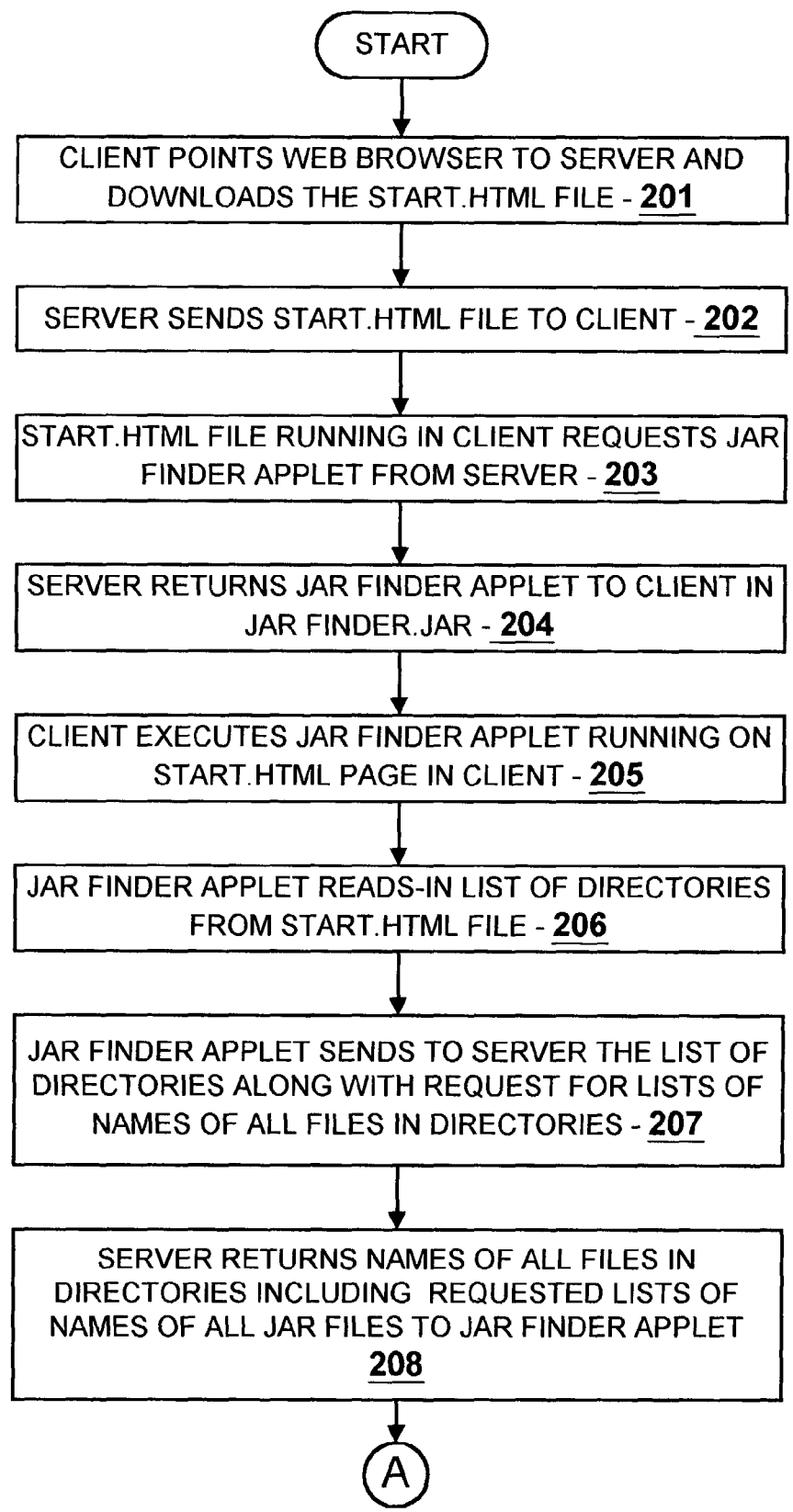
FIG. 2 is a first portion of a flowchart illustrating a first portion of an algorithm executed by embodiments of the present invention; and, FIG. 3 is the remaining portion of the flowchart of FIG. 2 illustrating the remaining portion of an algorithm executed by embodiments of the present invention.

FIGS. 2 and 3—Flowcharts

FIG. 2 is a first portion and FIG. 3 is the remaining portion of a flowchart illustrating an algorithm executed by embodiments of the present invention. The following discussion of the actions depicted in the blocks of FIGS. 2 and 3 also refers back to the hardware and software components depicted in block diagram format in FIG. 1 to which reference may be made as necessary. In block 201 client 100 points its web browser to server 101 and downloads start.H-

TML file 103. In other words, the user at the terminal of the workstation inserts the Internet Protocol (IP) address of server 101 into the Universal Resource Locator (URL) slot in a dialogue on the terminal screen and follows whatever steps are necessary to download start.HTML file 103 from server 101 in which it was housed (stored). This action takes place over HTTP link 102. In block 202, server 101 responds to this command from client 100 and sends start.HTML file 103 to client 100 via link 102, whereupon client 100 runs start.HTML file 103. Start.HTML file 103 may be written in JavaScript.

In block 203, start.HTML file 103, running in client 100, requests Jar finder applet 104 which is also housed in Server 101. This request may also be made over HTTP link 102. As noted, an applet is an application written in JAVA language and although Server 101 is running a different object-oriented high level language, namely C++, there is no incompatibility because Server 101 does not take any action upon the internal contents of the applet—it merely houses the applet. In block 204 server 101 finds and returns Jar finder applet 104 in JarFinder.Jar to Client 100 over link 102. JarFinder.Jar is a file containing the Jar finder applet in a compressed format. In block 205 Client 100 executes Jar finder applet 104 which runs on the Start.HTML page in client 100.

As noted earlier, the function of Jar finder applet 104 is to locate all Jar files relevant to a particular customer's or user's needs which are required to enable startup of operation of the user applet. To accomplish this, the first step that Jar finder applet 104 must undertake is noted in block 206 wherein the applet reads-in a list of directories (or directory list) 105 from the start.HTML file via method call 107. That list of directories as contained in the start.HTML file may include other than Jar files. [That list of directories is a parameter to Jar finder applet 104. Jar finder applet 104 requests the contents of each directory from the server which returns names of all files in those directories. Those files that do not end in ".jar" are then filtered out and discarded by the Jar finder applet. Thereafter, when Jar finder applet 104 is invoked, which is similar to receiving a method call, Jar finder applet 104 returns the filtered list of names of Jar files to the start.HTML file and thereby passes to Jar user applet 106 that list of names of Jar files which are all on the same page. This operation is discussed in detail hereinbelow.]. The directory list was held within start.HTML page 103 when that page was housed in server 101. Therefore, that list was forwarded by server 101 to client 100 along with start.HTML page 103 when the latter was forwarded. As earlier noted, to facilitate different startup routines, developers have easy access to this directory list while housed in server 101 which they can readily modify or exchange with a different directory list to satisfy differing needs of different customer/users.

Method call 107 is a JavaScript call. Within start.HTML, all code and method calls are done in JavaScript. An example of JavaScript code that invokes the Jar finder applet with the list of directories from which to construct a Jar user applet related to NAVISPHERE® software is provided in Table I:

TABLE I

INVOKING JAR FINDER APPLET - JAVASCRIPT CODE if (_isWinOS == true && false == _ns7)
{
  document.writeln('<OBJECT classid="clsid:8AD9C840-044E-11D1-B3E9-00805F499D93" NAME="jarFinderApplet" width=0 height=0

TABLE I-continued

INVOKING JAR FINDER APPLET - JAVASCRIPT CODE align="baseline" mayscript="true" codebase="http://java.sun.com/products/plugin/1.3/jinstall-13-win32.cab#Version=1,3,0,0"> <PARAM NAME="codebase" VALUE="."> <PARAM NAME="archive" VALUE="framework/common" + _naviVersion + '.jar,framework/logging' + _naviVersion + '.jar,framework/commapi' + _naviVersion + '.jar,jarFinder/jarFinder' + _naviVersion + '.jar"> <PARAM NAME="code" VALUE="jarFinder.jarFinder.class"> <PARAM NAME="type" VALUE="application/x-java-applet;version=1.3"> <PARAM NAME="jarDirs" VALUE="api,bundles,framework"> <PARAM NAME="useLiveConnect" VALUE=' + _useLiveConnect + '> <PARAM NAME="MAYSCRIPT" VALUE="true"> <PARAM NAME="scriptable" VALUE="true"> </OBJECT>');
}
else
{
  document.writeln('<APPLET name="jarFinderApplet" width=0 height=0 align="baseline" code="jarFinder.jarFinder.class" codebase="." scriptable=false mayscript=true archive="framework/common' + _naviVersion + '.jar,framework/logging' + _naviVersion + '.jar,framework/commapi' + _naviVersion + '.jar,jarFinder/jarFinder' + _naviVersion + '.jar" jarDirs="api,bundles,framework" useLiveConnect=' + _useLiveConnect + '> </APPLET>');
}

As reflected in Table I, the Jar finder applet is invoked with a call to "document.writeln", the same method which is used to invoke the Jar user applet. The "if/else" clause implements one of two code paths based on which operating system is running. The first, "if", clause handles Windows operating systems, while the second, "else", clause handles other operating systems such as Sun Solaris and Linux. If the variable "_isWinOS" is true, this means a Windows system is operating and the first, "if", clause executes and the second clause does not execute. If that variable is not true, a non-Windows operating system is operating and the second, "else", clause executes and the first clause does not. Certain boldface text in Table I shows where directory names are specified for the Jar finder applet; in this example there are three directories in which Jar finder must look, namely: api, bundles, and framework.

Next, in block 207, Jar finder applet 104 sends to server 101 the list of directories which it acquired via block 206 along with a request for lists of names of all files in those directories. This request is made over HTTP link 108. As noted in block 208, server 101 returns names of all of the files in the specified directories, not only the Jar files associated with the ".JAR" extension, to Jar finder applet over Http link 109. At this point, only the names of the files including the Jar files are returned to the client's HTML page; the actual Jar files with their respective contents that are necessary to achieve user application startup have yet to be manifested in the client. The algorithmic process moves to tab "A" in FIG. 3 whereafter any file names not ending in ".jar" are essentially filtered out.

In FIG. 3, decision block 301 asks if the browser software being used supports LiveConnect which is a communication protocol that permits communication between (1) JavaScript in which start.HTML file 103 is written and (2) JAVA in which the applets are written. LiveConnect is commercially available for the Internet Explorer browser and has been made available for the Netscape Navigator browser. However, LiveConnect does not work with browsers that are compatible with the Sun Solaris™ operating environment. Therefore, if the answer to the query posed in block 301 is "yes", then the browser is either Internet Explorer or Netscape Navigator for Windows or some other Windows-compatible browser and the algorithmic process moves to block 302.

In accordance with the act indicated in block 302, Jar finder applet 104 uses LiveConnect to invoke a method called "SETJARLIST" on the start.HTML page. Referring to block 303, the SETJARLIST method receives as input parameters the lists of names of Jar files which the user application needs. In other words, this method receives the lists of names of Jar files returned by server 101 to Jar finder applet 104 in step 208. Thereafter, in accordance with the action of block 306, the SETJARLIST method invokes Jar user applet 106 via method call 110 and passes the lists of names of Jar files to Jar user applet 106. Jar user applet 106 receives the lists of names and through start.HTML page 103, in accordance with the action of block 307, requests from server 101 via HTTP link 111 the actual Jar files corresponding to the names of Jar files on the lists. Thereafter, in block 308, server 101 forwards the requested actual Jar files over HTTP link 112 directly to Jar user applet 106 which loads the Jar files and its classes. By loading, two activities are covered, namely: (a) the actual obtaining of the Jar files—essentially a download of copies of the Jar files from server 101 to Jar user applet 106; and (b) the expansion or uncompressing of the code in those Jar files which was maintained in compressed format (similar to operation of a ZIP file) and reading that uncompressed code into memory. At this point, client 100 now has loaded within its jurisdiction a full complement of actual Jar files containing all necessary information to enable a successful startup operation of the user application and client 100 proceeds to process those Jar files to achieve that objective.

However, if the answer to the query posed in block 301 is "no", then the browser is not a Windows-compatible Netscape Navigator Navigator or Internet explorer browser, but it may be compatible with the Sun Solaris operating environment. If Sun Solaris compatible, then the algorithmic process moves to block 304. In block 304 Jar finder applet 104 fetches its "applet context". Applet context is the environment in which an applet is running, namely: the start.HTML page, any other applets that may be running on the same page, any methods that may be invoked on that page, etc. Then Jar finder applet 104 invokes a "SHOWDOCUMENT( )" method on that applet context which launches the SETJARLIST method on start.HTML page 103. By invoking the SHOWDOCUMENT( ) method, JAVA software provides an interface to the applet context. In other words, SHOWDOCUMENT( ) can accept whatever is inserted as a parameter, for instance "SETJARLIST", and can interpret that parameter as a URL. Accordingly, in both the Windows-compatible browser case and in the Sun Solaris-compatible browser case, Jar finder applet 104 is virtually being replaced as the active document in the browser by utilizing this SETJARLIST method, although this replacement is achieved in two different ways depending on the class of browser involved. Thereafter, the algorithmic process moves to block 305 wherein the SETJARLIST method directly accesses the data of Jar finder 104 to get lists of names of Jar files which it constructed (rather than receiving the lists of names of Jar files as input parameters). However, at this point in the algorithmic process the lists of names are just as available to the SETJARLIST method as if they were acquired by action of block 303. Therefore, the algorithmic process following the action of block 305 with respect to blocks 306, 307 and 308 is identical to that which followed from block 303 as described hereinabove.

Accordingly, SETJARLIST is a method on the start.HTML page which must determine if it was invoked via the LiveConnect protocol or by the SHOWDOCUMENT( ) method. If it determines that it was invoked via LiveConnect, then Jarfinder 104 is able to pass it the actual list of Jar files. Thus, SETJARLIST takes that list and invokes another method which may be called "launchFramework" (if the user application is known as "Framework") to invoke Jar user applet 106 (the user application). This other method is discussed in detail below. But, if SETJARLIST determines that it was not invoked by LiveConnect, then it has to call back into Jar finder applet 104 to actually get the list of names of Jar files that Jar finder applet 104 had stored—i.e., the SETJARLIST function returns to the Jar finder applet and extracts the data directly from it. Then, SETJARLIST calls the same "launchFramework" method to invoke the user applet.

The method "launchFramework" (not shown) is functionally included within block 306 and is invoked within the action of the SETJARLIST method invoking the Jar user applet. The launchFramework method launches the user application (Jar user applet) by employing the "document.writeln" command. The term "document" is a software object which refers to the HTML document/page/file which is being executed—what has been referred to herein as the start.HTML page. The term "writeln" is a method on the document object which writes output to the document's web browser and which is capable of receiving a single String parameter. A String parameter containing the Jar user applet and all of the Jar user applet's parameters is passed to the writeln method. This results in the Jar user applet itself being "written" to the document's output, which is the same as starting up the Jar user applet. Therefore, the Jar user applet is launched.

The String which is passed to the writeln method contains the Jar user applet's title, height, and width specifications, margins, background color, name of Java plugin, name of the Java user applet's JAVA class, and the sought-after Jar files. Since Windows-compatible browsers and Sun Solaris-compatible browsers have different formats for their parameter strings, the launchFramework method is structured differently for each as follows: (a) for Windows operating systems, call "document.writeln" to launch the framework with parameters formatted for Windows, and (b) for Sun Solaris operating environments, call "document.writeln" to launch the framework with parameters formatted for Sun Solaris.

Another advantage which is provided by the present invention is its use of the caching facility which is built into the JAVA runtime. In other words, because both applets are arranged to operate on the same start.HTML web page, all files that are sent from the Jar finder applet to the Jar user applet may be stored in the JAVA cache. This allows the user to decrease start time by not having to download large Jar files from the web server each time the UI application is started up—the files may be stored in the cache from a prior start-up operation. Moreover, in prior techniques using only a single applet where typically that applet "went over the wire" to load Jar files dynamically, those techniques necessarily bypass the Java cache and require a complete repeat of the fetching and loading operation every time the user application started up because the Jar files were not, and could not be, locally stored in the Java cache.

The method, system, and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a general purpose computer or processor, the machine becomes an apparatus for practicing the invention because the program code combines with the machine to provide a unique apparatus that operates analogously to operation of specific logic circuits. Methods and apparatus of the present invention may also be embodied in forms of program code that are transmitted over a transmission medium, such as over electrical wiring or cabling, through fiber optics, or via any other transmission medium.

Moreover, the flowcharts used herein to demonstrate various aspects of the invention should not be construed to limit the present invention to any particular logic flow or logic implementation. The described logic may be partitioned into different logic blocks, (e.g., programs, modules, functions, or subroutines) without changing the overall results or otherwise departing from the true scope of the invention. The present invention may be embodied in many different forms, including, but not limited to, computer program logic for use with any kind of processor, programmable logic for use with any kind of programmable logic device, discrete components, integrated circuitry including application specific integrated circuits (ASICs), or any other means including any combination thereof. Computer program logic implementing all or part of the functionality described herein may be embodied in various forms, including, but not limited to, source code form, computer executable form, and various intermediate forms (e.g. forms generated by an assembler, compiler, linker, or locator.) Source code may include a series of computer program instructions implemented in any of various programming languages for use with various operating systems or operating environments. The source code may define and use various data structures and communication messages. The source code may be in computer executable form, or it may be in a form convertible into computer executable form. The computer program may be fixed in any form either permanently or transitorily in a tangible storage medium, such as a semiconductor memory device, a magnetic memory device, an optical memory device, a PC card, or other memory device. The computer program many be fixed in any form in a signal that is transmittable to a computer using any of various communication technologies including, but not limited to, analog, digital, optical, wireless, networking, and internetworking technologies. The computer program may be distributed in any form as a removable storage medium with accompanying printed or electronic documentation, preloaded with a computer system (e.g. on system ROM or fixed disk), or distributed from a server or electronic bulletin board over the communication system (e.g., the Internet or World Wide Web).

The present embodiments are to be considered in all respects as illustrative and not restrictive. For example, more than two applets could be employed on the HTML page in accordance with principles of the present invention. There could be multiple applets doing work that coordinate the feeding of information where, for example, if two bits of information were needed, an additional applet could do pre-information gathering to reconcile any issues about the information and thereafter pull the information into the more central or main applet, etc. In FIG. 1, more than two applets are implied by reference to the term "APPLET(S)". Furthermore the principles of the present invention may be applied to high level computer languages other than JAVA. For example, C++ offers functionality equivalent to applets which could be used in the context of the Jar finder and Jar user applets of the present invention. Therefore, the scope of the invention is indicated by the appended claims rather than by the foregoing description, and all changes which come within the meaning and range of equivalency of the claims are therefore intended to be embraced therein.

What is claimed is:

1. A computer program product for use in a client server network, said client configured to run its application program in Java language, said computer program product configured to run on said client and including a computer storage medium having computer readable program code thereon for loading from said server into said client Java archive (Jar) files required by said client for startup operation of said application program, said program code comprising:
 program code for establishing a support platform file in said client, said file including a list of directories containing names of said Jar files;
 program code for establishing a Jar finder applet and a Jar user applet in said support platform file;
 program code for reading said list of directories into said Jar finder applet;
 said Jar finder applet including program code for forwarding said list of directories to said server and for requesting a list of names of Jar files in said directories;
 said server including program code for returning said list of names of Jar files to said Jar finder applet;
 program code for passing said list of names of Jar files from said Jar finder applet to said Jar user applet; and,
 said Jar user applet including program code:
 operating through said support platform file, for requesting said Jar files from said server;
 for receiving said Jar files directly from said server, and,
 for loading said Jar files and classes within said Jar files into said Jar user applet.

2. The computer program product of claim 1 wherein said support platform file is an HTML file written in Javascript language.

3. The computer program product of claim 2 wherein said client includes a workstation interfacing with a human operator and wherein said HTML file establishing program code includes an Internet web browser pointed to said server by said human operator.

4. The computer program product of claim 3 wherein said web browser is one of a plurality of web browsers and said passing program code is operable with any of said plurality of web browsers.

5. The computer program product of claim 4 wherein said plurality of web browsers includes Internet Explorer and Netscape Navigator.

6. The computer program product of claim 3 further comprising program code for modifying at least one of said Jar files including adding to or deleting from the total number of said Jar files, said modifying program code including program code by which said list of directories may be changed or exchanged with a different list of directories.

7. In a client server network, said client configured to run its application program in Java language, a method for loading from said server into said client Java archive (Jar) files required by said client for startup operation of said application program, said method comprising:
 establishing a support platform file in said client, said file including a list of directories containing names of said Jar files;
 establishing a Jar finder applet and a Jar user applet in said support platform file;

reading said list of directories into said Jar finder applet;
forwarding said list of directories to said server;
requesting a list of names of Jar files in said directories;
returning said list of names of Jar files to said Jar finder applet;
passing said list of names of Jar files from said Jar finder applet to said Jar user applet;
said Jar user applet requesting and receiving said Jar files from said server; and,
loading said Jar files and classes within said Jar files into said Jar user applet.

8. The method of claim 7 wherein said support platform file is an HTML file written in Javascript language.

9. The method of claim 8 wherein said client includes a workstation interfacing with a human operator and wherein said HTML file establishing includes an Internet web browser pointed to said server by said human operator.

10. The method of claim 9 wherein said web browser is one of a plurality of web browsers and said passing is operable with any of said plurality of web browsers.

11. The method of claim 10 wherein said plurality of web browsers includes Internet Explorer and Netscape Navigator.

12. The method of claim 9 further comprising:
modifying at least one of said Jar files including adding to or deleting from the total number of said Jar files, said modifying including changing said list of directories or exchanging said list of directories with a different list of directories.

13. In a client server network, said client configured to run its application program in Java language, a system for loading from said server into said client Java archive (Jar) files required by said client for startup operation of said application program, said system comprising:
means for establishing a support platform file in said client, said file including a list of directories containing names of said Jar files;
means for establishing a Jar finder applet and a Jar user applet in said support platform file;
means for reading said list of directories into said Jar finder applet;
said Jar finder applet including means for forwarding said list of directories to said server and for requesting a list of names of Jar files in said directories;
said server including means for returning said list of names of Jar files to said Jar finder applet;
means for passing said list of names of Jar files from said Jar finder applet to said Jar user applet; and,
said Jar user applet including means:
operating through said support platform file, for requesting said Jar files from said server;
for receiving said Jar files directly from said server, and,
for loading said Jar files and classes within said Jar files into said Jar user applet.

14. The system of claim 13 wherein said support platform file is an HTML file written in Javascript language.

15. The system of claim 14 wherein said client includes a workstation interfacing with a human operator and wherein said HTML file establishing means includes an Internet web browser pointed to said server by said human operator.

16. The system of claim 15 wherein said web browser is one of a plurality of web browsers and said passing means is operable with any of said plurality of web browsers.

17. The system of claim 16 wherein said plurality of web browsers includes Internet Explorer and Netscape Navigator.

18. The system of claim 15 further comprising means for modifying at least one of said Jar files including adding to or deleting from the total number of said Jar files, said modifying means including means by which said list of directories may be changed or exchanged with a different list of directories.

19. A system for loading files from a server into a client comprising:
means for establishing a support platform file in said client, said client including a list of directories containing names of said files;
means for establishing a file finder application and a file user application in said support platform file;
means for reading said list of directories into said file finder application;
said file finder application including means for forwarding said list of directories to said server and for requesting a list of names of said files in said directories;
said server including means for returning said list of names of said files to said file finder application;
means for passing said list of names of said files from said file finder application to said file user application; and,
said file user application including means:
operating through said support platform file, for requesting said files from said server;
for receiving said files directly from said server; and,
for loading said files and classes within said files into said client.

20. A computer program product for loading files from a server into a client, configured to run on said client, and including a computer storage medium having computer readable program code thereon for loading files from said server into said client, said program code comprising:
program code for establishing a support platform file in said client, said client including a list of directories containing names of said files;
program code for establishing a file finder application and a file user application in said support platform file;
program code for reading said list of directories into said file finder application;
said file finder application including program code for forwarding said list of directories to said server and for requesting a list of names of said files in said directories;
said server including program code for returning said list of names of said files to said file finder application;
program code for passing said list of names of said files from said file finder application to said file user application; and,
said file user application including program code:
operating through said support platform file, for requesting said files from said server;
for receiving said files directly from said server; and,
for loading said files and classes within said files into said client.

21. A method for loading files from a server into a client comprising:
establishing a support platform file in said client, said client including a list of directories containing names of said files;
establishing a file finder application and a file user application in said support platform file;
reading said list of directories into said file finder application;
forwarding said list of directories to said server;
requesting a list of names of said files in said directories;

returning said list of names of said files to said file finder application;

passing said list of names of said files from said file finder application to said file user application;

said file user application requesting and receiving said files from said server; and, loading said files and classes within said files into said client.

22. Apparatus for loading files from a server into a client comprising:

a first device which establishes a support platform file in said client, said client including a list of directories containing names of said files;

a second device which establishes a file finder application and a file user application in said support platform file;

a third device which reads said list of directories into said file finder application;

said file finder application including a fourth device which forwards said list of directories to said server and requests a list of names of said files in said directories;

said server including a fifth device which returns said list of names of said files to said file finder application;

a sixth device which passes said list of names of said files from said file finder application to said file user application; and, said file user application including a seventh device:

operating through said support platform file, which requests said files from said server;

and receives said files directly from said server; and, and loads said files and classes within said files into said client.

* * * * *